US010979426B2

(12) United States Patent
Wagner et al.

(10) Patent No.: US 10,979,426 B2
(45) Date of Patent: Apr. 13, 2021

(54) PRIVACY-PROTECTING DEDUPLICATION

(71) Applicant: Visa International Service Association, San Francisco, CA (US)

(72) Inventors: Kim Wagner, Sunnyvale, CA (US); Sunpreet Singh Arora, San Mateo, CA (US); Lacey Best-Rowden, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/647,683

(22) PCT Filed: Sep. 24, 2018

(86) PCT No.: PCT/US2018/052393
§ 371 (c)(1),
(2) Date: Mar. 16, 2020

(87) PCT Pub. No.: WO2019/067348
PCT Pub. Date: Apr. 4, 2019

(65) Prior Publication Data
US 2020/0220870 A1 Jul. 9, 2020

Related U.S. Application Data

(60) Provisional application No. 62/563,200, filed on Sep. 26, 2017.

(51) Int. Cl.
*H04L 29/06* (2006.01)
*H04L 9/30* (2006.01)

(52) U.S. Cl.
CPC .......... *H04L 63/0861* (2013.01); *H04L 9/30* (2013.01); *H04L 63/0428* (2013.01)

(58) Field of Classification Search
CPC ..... H04L 63/0861; H04L 9/30; H04L 9/3231; G06F 21/32
See application file for complete search history.

(56) References Cited

U.S. PATENT DOCUMENTS

| 2008/0052527 A1* | 2/2008 | Siedlarz | G06F 21/6254 |
| | | | 713/186 |
| 2010/0115114 A1* | 5/2010 | Headley | G10L 17/22 |
| | | | 709/229 |

(Continued)

FOREIGN PATENT DOCUMENTS

WO    2014193465    12/2014

OTHER PUBLICATIONS

PCT/US2018/052393 , "International Preliminary Report on Patentability", dated Apr. 9, 2020, 7 pages.

(Continued)

*Primary Examiner* — Ellen Tran
(74) *Attorney, Agent, or Firm* — Kilpatrick Townsend & Stockton LLP (57) ABSTRACT

A method is disclosed. The method includes a server computer receiving, from a user device, a first encrypted biometric template, wherein the server computer stores a plurality of encrypted enrollment biometric templates, and a table comprising a plurality of encrypted match values and corresponding unencrypted match values. The server computer can then, for each of the plurality of encrypted enrollment biometric templates, input the first encrypted biometric template and an encrypted enrollment biometric template into a function to obtain an encrypted match value. The server computer can then, for each of the plurality of encrypted enrollment biometric templates, determine if the encrypted match value corresponds to an unencrypted match value using the table, wherein the unencrypted match value is greater than a threshold. The server computer can then (Continued)

provide a notification to the user device or another device associated with the unencrypted match value.

20 Claims, 6 Drawing Sheets

(56) References Cited

U.S. PATENT DOCUMENTS

| | | |
|---|---|---|
| 2011/0001607 A1 | 1/2011 | Kamakura |
| 2013/0097380 A1 | 4/2013 | Colgrove et al. |
| 2013/0314208 A1* | 11/2013 | Risheq .................. G07C 9/257 340/5.53 |
| 2013/0318361 A1* | 11/2013 | Erickson ................. G06F 21/32 713/193 |
| 2014/0337368 A1 | 11/2014 | Mysen et al. |
| 2015/0117639 A1 | 4/2015 | Feekes |

OTHER PUBLICATIONS

PCT/US2018/052393 , "International Search Report and Written Opinion", dated Jan. 17, 2019, 12 pages.

\* cited by examiner

TABLE

| Encrypted Domain 1 602 | Unencrypted Domain 1 604 |
|---|---|
| {t}K | t |
| {t+1}K | t+1 |
| {t+2}K | t+2 |
| ⋮ | ⋮ |
| {t+n}K | t+n |

*FIG. 6*

PRIVACY-PROTECTING DEDUPLICATION

CROSS-REFERENCES TO RELATED APPLICATIONS

This is a National Stage of International Application No. PCT/US2018/052393, International Filing Date Sep. 24, 2018, which claims benefit of the provisional patent application, Application No. 62/563,200, filed on Sep. 26, 2017, which is incorporated herein by reference in their entirety.

BACKGROUND

Embodiments address the problem of duplicates existing in databases. This could be with the aim of fraud prevention, such as detecting if the same person is attempting to enroll twice, i.e., pretending to be two different persons. Detecting and preventing the enrollment of duplicates is called deduplication.

The way deduplication usually works is that all biometric templates are stored in a central database, and when a new registration is received, the biometric template that accompanies it is compared with all the biometric templates already in the database. If a matching template is found, the registration can either be rejected outright as a duplicate, or further investigation can be undertaken, depending on the level of confidence in the discriminative capacity of the biometrics used.

One drawback is to deduplication methods is that they require a central database, which is a single point of vulnerability.

Another drawback to conventional data storage systems is that they are not suitable for biometric deployments where each consumer stores their own template on their own device (e.g. mobile phone), and where there is no central repository. Additionally, deduplication across multiple repositories, e.g., one repository maintained per state, is infeasible.

Embodiments of the invention address these and other problems individually and collectively.

SUMMARY

One embodiment of the invention is directed to a method comprising: a) receiving, by a server computer from a user device, a first encrypted biometric template, wherein the server computer stores a plurality of encrypted enrollment biometric templates, and a table comprising a plurality of encrypted match values and corresponding unencrypted match values; b) for each of a plurality of encrypted enrollment biometric templates in the server computer, inputting, by the server computer, the first encrypted biometric template and an encrypted enrollment biometric template into a function to obtain an encrypted match value; c) for each of the plurality of encrypted enrollment biometric templates in the server computer, determining if the encrypted match value corresponds to an unencrypted match value using the table; and d) providing a notification to the user device or another device regarding the unencrypted match value.

Another embodiment of the invention is directed to a server computer comprising a processor; a memory; and a computer-readable medium coupled to the processor, the computer-readable medium comprising code executable by the processor for implementing a method comprising: a) receiving, from a user device, a first encrypted biometric template, wherein the server computer stores a plurality of encrypted enrollment biometric templates, and a table comprising a plurality of encrypted match values and corresponding unencrypted match values; b) for each of a plurality of encrypted enrollment biometric templates in the server computer, inputting the first encrypted biometric template and an encrypted enrollment biometric template into a function to obtain an encrypted match value; c) for each of the plurality of encrypted enrollment biometric templates in the server computer, determining if the encrypted match value corresponds to an unencrypted match value using the table; and d) providing a notification to the user device or another device regarding the unencrypted match value.

Another embodiment of the invention is directed to a method comprising: receiving, by a user device, a biometric sample from a user; creating, by the user device, a first biometric template from the biometric sample; encrypting, by the user device, the first biometric template with a public key to yield a first encrypted biometric template; transmitting, by the user device, the first encrypted biometric template to a server computer, wherein for each of a plurality of encrypted enrollment biometric templates stored in the server computer, the server computer inputs the first encrypted biometric template and an encrypted enrollment biometric template into a function to obtain an encrypted match value, wherein for each of the plurality of encrypted enrollment biometric templates the server computer determines if the encrypted match value corresponds to an unencrypted match value using a table; and receiving, by the user device, a notification regarding the unencrypted match value.

Another embodiment of the invention is directed to a user device comprising: a processor; a memory; and a computer-readable medium coupled to the processor, the computer-readable medium comprising code executable by the processor for implementing a method comprising: receiving a biometric sample from a user; creating a first biometric template from the biometric sample; encrypting the first biometric template with a public key to yield a first encrypted biometric template; transmitting the first encrypted biometric template to a server computer, wherein for each of a plurality of encrypted enrollment biometric templates stored in the server computer, the server computer inputs the first encrypted biometric template and an encrypted enrollment biometric template into a function to obtain an encrypted match value, wherein for each of the plurality of encrypted enrollment biometric templates the server computer determines if the encrypted match value corresponds to an unencrypted match value using a table; and receiving a notification regarding the unencrypted match value.

Further details regarding embodiments of the invention can be found in the Detailed Description and the Figures.

DETAILED DESCRIPTION

Prior to discussing embodiments of the invention, some terms can be described in further detail.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more user devices. In some embodiments, a server computer may be a remote server computer. A remote server computer may be located remotely in reference to a server computer and/or a user device.

A "user device" may be any suitable device that can interact with a user (e.g., a payment card or mobile phone). In some embodiments, a user device may communicate with or may be at least a part of a server computer. User devices may be in any suitable form. Some examples of user devices include point-of-sale (POS) devices, cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, and security systems, remote computers operating Websites, and the like. In some embodiments, a user device may use any suitable contact or contactless mode of operation to send or receive data from, or associated with, a payment device and/or a mobile device. In some embodiments, where a user device may comprise a mobile device, any suitable mobile device may be used and may include a display, a memory, a processor, a computer-readable medium, and any other relevant component.

An "application" may be a computer program that is used for a specific purpose.

A "user" may include an individual. In some embodiments, a user may be associated with one or more personal accounts and/or user devices.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. In some embodiments, a key may be any string of bits used by a cryptographic algorithm to transform plain text into cipher text or vice versa. Keys may include symmetric and asymmetric keys. A key may be used to sign data transfer request/response messages. For example, a data transfer request/response message may be signed using a private key. The signed data transfer request/response message may then be verified using a public key that corresponds to the private key.

A "public key" may be a type of key that is distributed to, or available to, some entity other than a party holding a corresponding private key. The public key may be designed to be shared and may be configured such that any information encrypted with the public key may only be decrypted using an private key associated with the public key (i.e., a public/private key pair).

A "private key" may include any encryption key that may be protected and secure. For example, the private key may be securely stored at an entity that generates a public/private key pair and may be used to decrypt any information that has been encrypted with the associated public key of the public/private key pair. A private key may be used to sign data such that the data may be verified by another electronic device.

A "public/private key pair" may include a pair of linked cryptographic keys generated by an entity. The public key may be used for functions such as encrypting a message and/or data to send to an entity or for verifying a digital signature which was supposedly made by the entity. The private key, on the other hand may be used for functions such as decrypting a received message or applying a digital signature. The public key may be authorized by a body known as a certification authority (i.e., certificate authority) which can store the public key in a database and distributes it to any other entity which requests it. The private key may be kept in a secure storage medium and will usually only be known to the entity. However, the cryptographic systems described herein may feature key recovery mechanisms for recovering lost keys and avoiding data loss. In some embodiments, the entity may securely discard (i.e., destroy) the private key.

A "biometric sample" includes data that can be used to uniquely identify an individual based upon one or more intrinsic physical or behavioral traits. For example, a biometric sample may include retinal scan and tracking data (i.e., eye movement and tracking where a user's eyes are focused). Further examples of biometric samples include a face, fingerprint, voiceprint, palm print, DNA, body scan, etc.

A "biometric template" can be a digital reference of distinct characteristics that have been extracted from a biometric sample provided by a user. Biometric templates are used during a biometric authentication process. Data from a biometric sample provided by a user at the time of authentication can be compared against previously created biometric templates to determine whether the provided biometric sample closely matches one or more of the stored biometric templates. The data may be either an analog or digital representation of the user's biometric sample. For example, a biometric template of a user's face may be image data, and a biometric template of a user's voice may be an audio file. Biometric templates can further include date representing measurements of any other intrinsic human traits or distinguishable human behaviors, such as fingerprint data, retinal scan data, deoxyribonucleic acid (DNA) date, palm print data, hand geometry date, iris recognition data, vein geometry data, handwriting style data, and any other suitable data associated with physical or biological aspects of an individual. For example, a biometric template may be a binary mathematical file representing the unique features of an Individual's fingerprint, eye, hand or voice needed for performing accurate authentication of the individual.

A "biometric reader" may refer to a device for measuring a biometric. Examples of biometric readers may include fingerprint readers, front-facing cameras, microphones, iris scanners, and DNA analyzers.

A "threshold" can be a minimum prescribed level and/or value. For example, a threshold can identify or quantify what degree of similarity is needed between two biometric templates (or other data) in order for the two biometric templates to qualify as a match. As an illustration, fingerprints contain a certain number of identifying features, if a threshold (e.g., 90%) amount of identifying features of a newly measured fingerprint are matched to a previously measured fingerprint, then the two fingerprints can be considered a match (and the probability that both fingerprints are from the same person may be high). Setting an appropriate threshold to ensure an acceptable level of accuracy and/or confidence would be appreciated by one of ordinary skill in the art.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Figure 1:
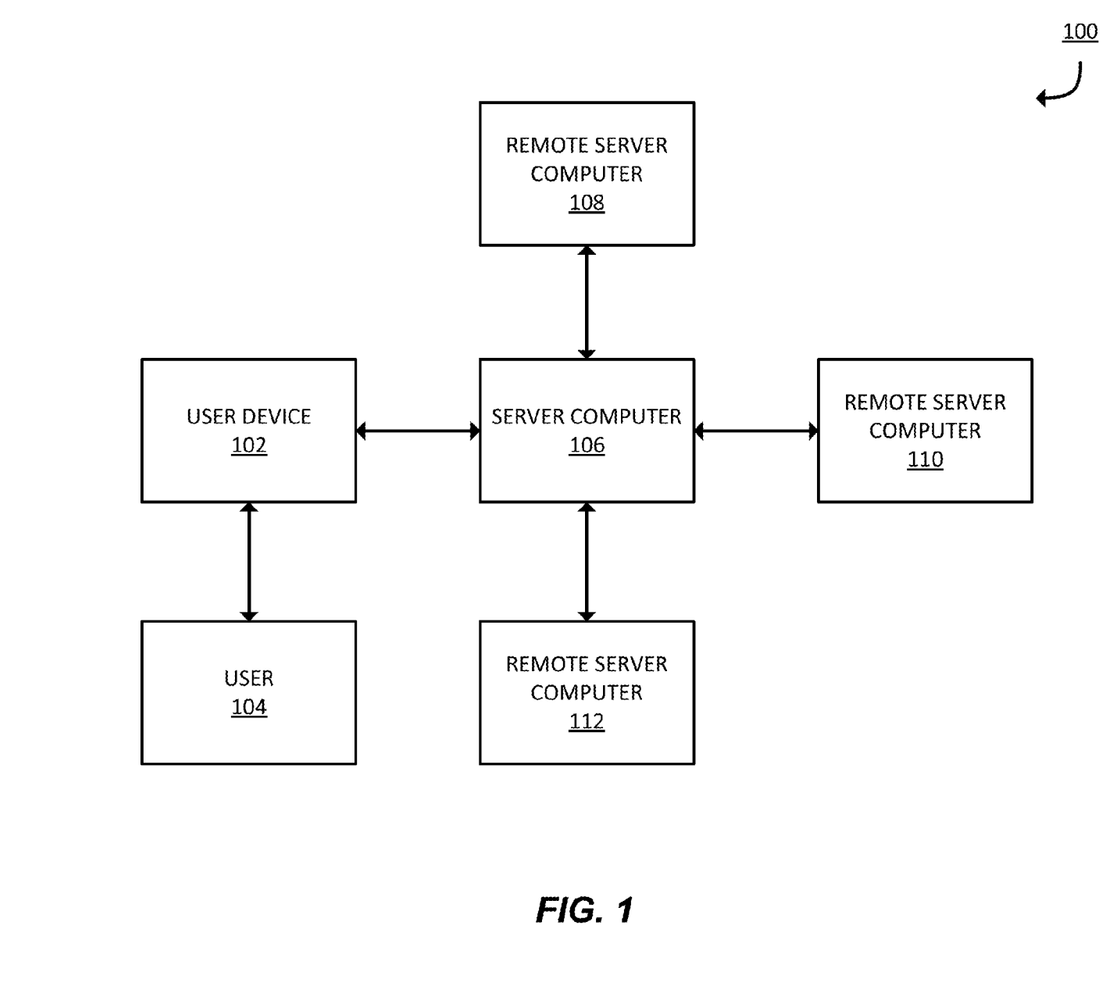
FIG. 1 shows a block diagram of a system according to an embodiment of the invention.

FIG. 1 shows a system 100 comprising a number of components according to an embodiment of the invention. The system 100 comprises a user device 102 operated by a user 104, a server computer 106 (also referred to as a proximate server computer), and remote server computers 108-112. The user device 102 may be in operative communication with the server computer 106. For example, in some embodiments, the user device 102 may communicate with the server computer 106 via a Wi-Fi or a Bluetooth communication channel. The server computer 106 may be in operative communication with a plurality of remote server computers, such as the remote server computers 108-112. In some embodiments, each remote server computer can be in operative communication with each of the other server computers. The user device 102 and the server computer 106 may be in the same or similar location, for example, in the same building or area, while the remote server computers 108-112 may be in a different building, area, or state.

The components in system 100 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. For example, in some embodiments, there may be five or even two hundred user devices. Further, there may be any suitable number of remote server computers configured to communicate with one another. For example, there may be 1, 10, 15, 50, 300, or other suitable number of remote server computers.

The user device 102 may be any suitable device that can interact with the user 104. In some embodiments, the user device 102 may be a mobile device capable of capturing a biometric sample. In some embodiments, the user device 102 may be operatively coupled to the server computer 106. For example, the user device 102 may be a device, such as a computer, at a same location as the server computer 106. The server computer 106 may be, as an example, a department of motor vehicles (DMV) server computer, while the user device 102 is a computer capable of communicating with the DMV server computer.

The server computer 106 may be capable of generating public/private key pairs. The server computer 106 may also be capable of providing public keys to other devices, such as the user device 102. In some embodiments, after generating a public/private key pair, the server computer 106 may be capable of constructing a conversion table using a public key as described herein. Further, the server computer 106 may be capable of securely discarding the private key associated with the public key used to generate the conversion table. The remote server computers 108-112 may have similar capabilities as the server computer 106.

Figure 2:
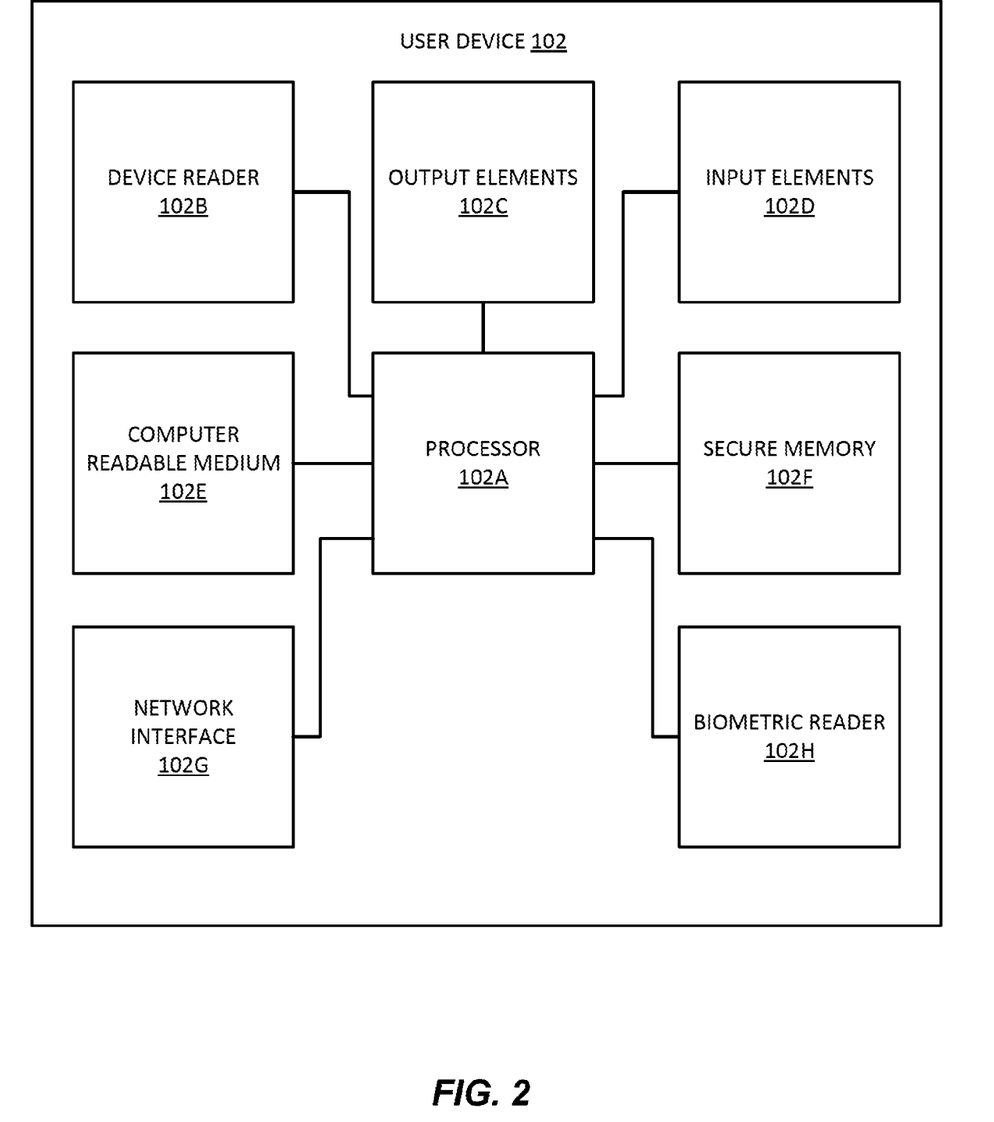
FIG. 2 shows a block diagram of components of a user device according to an embodiment of the invention.

FIG. 2 shows a block diagram of components of a user device 102 according to an embodiment of the invention. The exemplary user device 102 may comprise a processor 102A, a device reader 102B, an output element 102C, an input element 102D, a computer readable medium 102E, a secure memory 102F, a network interface 102G, and a biometric reader 102H.

The device reader 102B may comprise any suitable device capable of reading, providing, or writing data to or from a user device 102. Suitable device readers include antennas, electrical contacts, etc.

The output elements 102C may comprise any suitable devices that may output data. Examples of output elements 102C may include display screens, speakers, and data transmission devices.

The input elements 102D may include any suitable device capable of inputting data into the user device 102. Examples of input devices include buttons, touchscreens, touch pads, microphones, etc.

The computer readable medium 102E may comprise code, executable by the processor 102A. The computer readable medium 102E may contain any number of applications, modules, and code. The computer readable medium 102E may comprise code, executable by the processor 102A, to implement a method comprising: receiving, by a user device, a biometric sample from a user; creating, by the user device, a first biometric template from the biometric sample; encrypting, by the user device, the first biometric template with a public key to yield a first encrypted biometric template; transmitting, by the user device, the first encrypted biometric template to a server computer, wherein for each of a plurality of encrypted enrollment biometric templates stored in the server computer, the server computer inputs the first encrypted biometric template and an encrypted enrollment biometric template into a function to obtain an encrypted match value, wherein for each of the plurality of encrypted enrollment biometric templates the server computer determines if the encrypted match value corresponds to an unencrypted match value using a table; and receiving, by the user device, a notification regarding the unencrypted match value.

The secure memory 102F may store encrypted data such as encrypted biometric templates, key identifiers, public keys, and any other relevant data securely. The secure memory 102F may be in the form of a secure element, a hardware security module, or any other suitable form of secure data storage.

The network interface 102G may include an interface that can allow the user device 102 to communicate with external computers. Network interface 102G may enable the user device 102 to communicate data to and from another device (e.g., resource provider computer, authorization computer, etc.). Some examples of the network interface 102G may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 102G may include Wi-Fi™.

Data transferred via network interface 102G may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 102G and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The biometric reader 102H can be a device capable of obtaining a biometric sample from a user of the user device 102. For example, the biometric reader 102H can be an iris scanner, hand scanner, ear scanner, voice scanner, DNA scanner, and/or the like.

Figure 3:
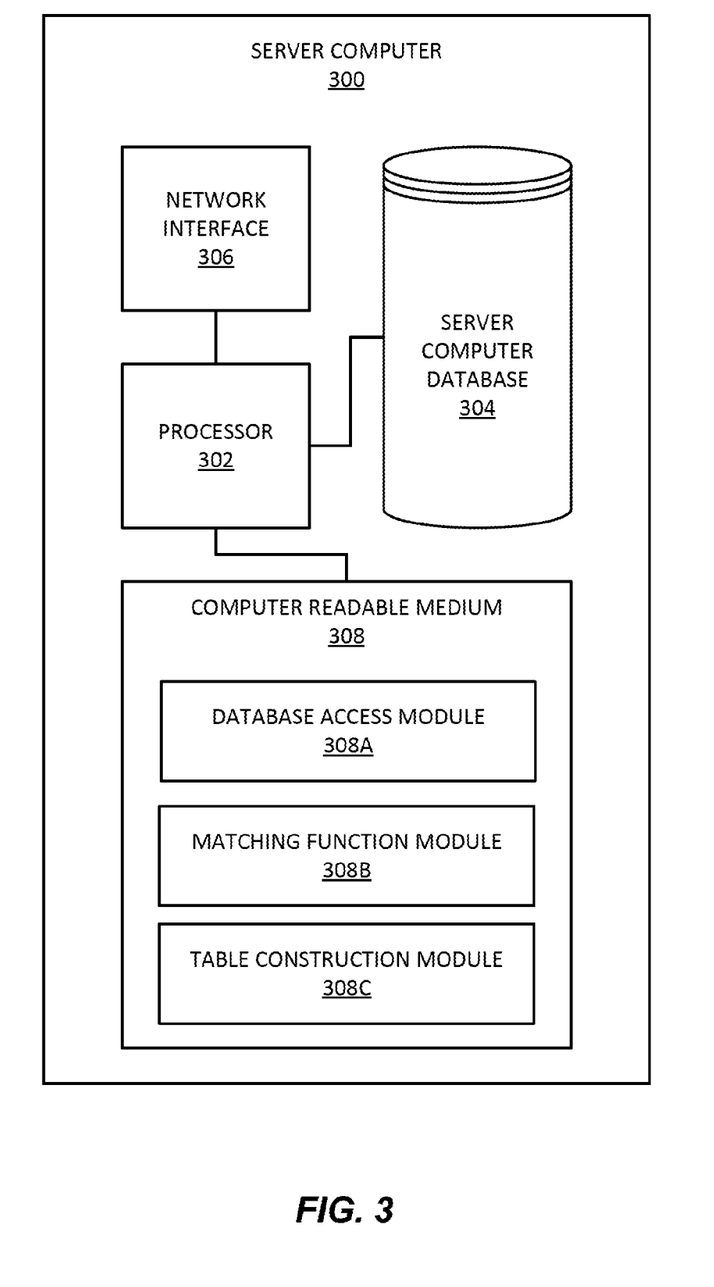
FIG. 3 shows a block diagram of components of a server computer according to an embodiment of the invention.

FIG. 3 shows a block diagram of components of a server computer 300 according to an embodiment of the invention. The exemplary server computer 300 may comprise a processor 302, a server computer database 304, a network interface 306, and a computer readable medium 308. The computer readable medium 308 can comprise a database access module 308A, a matching function module 308B, and a table construction module 308C.

The server computer database 304 may store data, such as encrypted biometric templates, securely. The server computer database 304 may be a conventional, fault tolerant, relational, scalable, secure database such as those commercially available from Oracle™ or Sybase™.

The network interface 306 may include an interface that can allow the server computer 300 to communicate with external computers. It may have similar properties and/or characteristics as the network interface 102G in the user device 102.

The computer readable medium 308 may comprise code, executable by the processor 302, to implement a method comprising: a) receiving, by a server computer from a user device, a first encrypted biometric template, wherein the server computer stores a plurality of encrypted enrollment biometric templates, and a table comprising a plurality of encrypted match values and corresponding unencrypted match values; b) for each of a plurality of encrypted enrollment biometric templates in the server computer, inputting, by the server computer, the first encrypted biometric template and an encrypted enrollment biometric template into a function to obtain an encrypted match value; c) for each of the plurality of encrypted enrollment biometric templates in the server computer, determining if the encrypted match value corresponds to an unencrypted match value using the table; and d) providing a notification to the user device or another device regarding the unencrypted match value.

The database access module 308A may comprise code or software, executable by the processor 302 for accessing the server computer database 304. The server computer 300 may use the database access module 308A in order to retrieve encrypted enrolled biometric templates. Additionally, the database access module 308A may be used by the server computer 300 in order to store new encrypted biometric templates, such as a first encrypted biometric template received from a user device, in the server computer database 304.

The matching function module 308B may, in conjunction with the processor 302, perform a matching function to determine an encrypted match value between two encrypted biometric templates. In some embodiments, the matching function module 308B may use homomorphic encryption. More precisely, assume that a biometric comparison (i.e., matching) algorithm match( ) is given, where match takes two biometric templates T1 and T2 as input and yields a match value as an output, which, in some embodiments, can be an integer from 0 to 99, with 99 indicating a very good match and 0 indicating no match. A function M( ) can be defined as follows:

$$M(T1,T2):=\text{if match}(T1,T2) \geq t \text{ then return match}(T1, T2) \text{ else return ran}( ).$$

t is a predetermined threshold, which can be an integer in $\{0, \ldots, 99\}$, and ran( ) can generate a unique random value drawn from a large set, such as, e.g. 128-bit integers. t can indicate when two templates are considered to match (when the match value is at least t). From the function M and a public key K, using the techniques of homomorphic encryption, a function $M_K( )$ can be constructed, with the property that for all T1 and T2, $M_K(\{T1\}K, \{T2\}K)=\{M(T1, T2)\}K$, that is, encryption with the public key K distributes over the modified matching calculation.

The server computer 300 may use a public key encryption scheme. Typically, the encryption scheme may be either RSA or elliptic curve (El Gamal). The public key K can be used by the devices in the system. The corresponding private key need not be taken into account, and in some embodiments, can be discarded and remain unused after generation of the key pair.

The table construction module 308C may, conjunction with the processor 302, construct a conversion table using a public key K. $\{x\}K$ may indicate an encryption of x with the public key K. The server computer 300 can be capable of constructing a conversion table comprising values in the unencrypted domain and values in the encrypted domain. The server computer 300 can construct the table of the values $\{t\}K, \{t+1\}K, \ldots, \{99\}K$.

Figure 6:
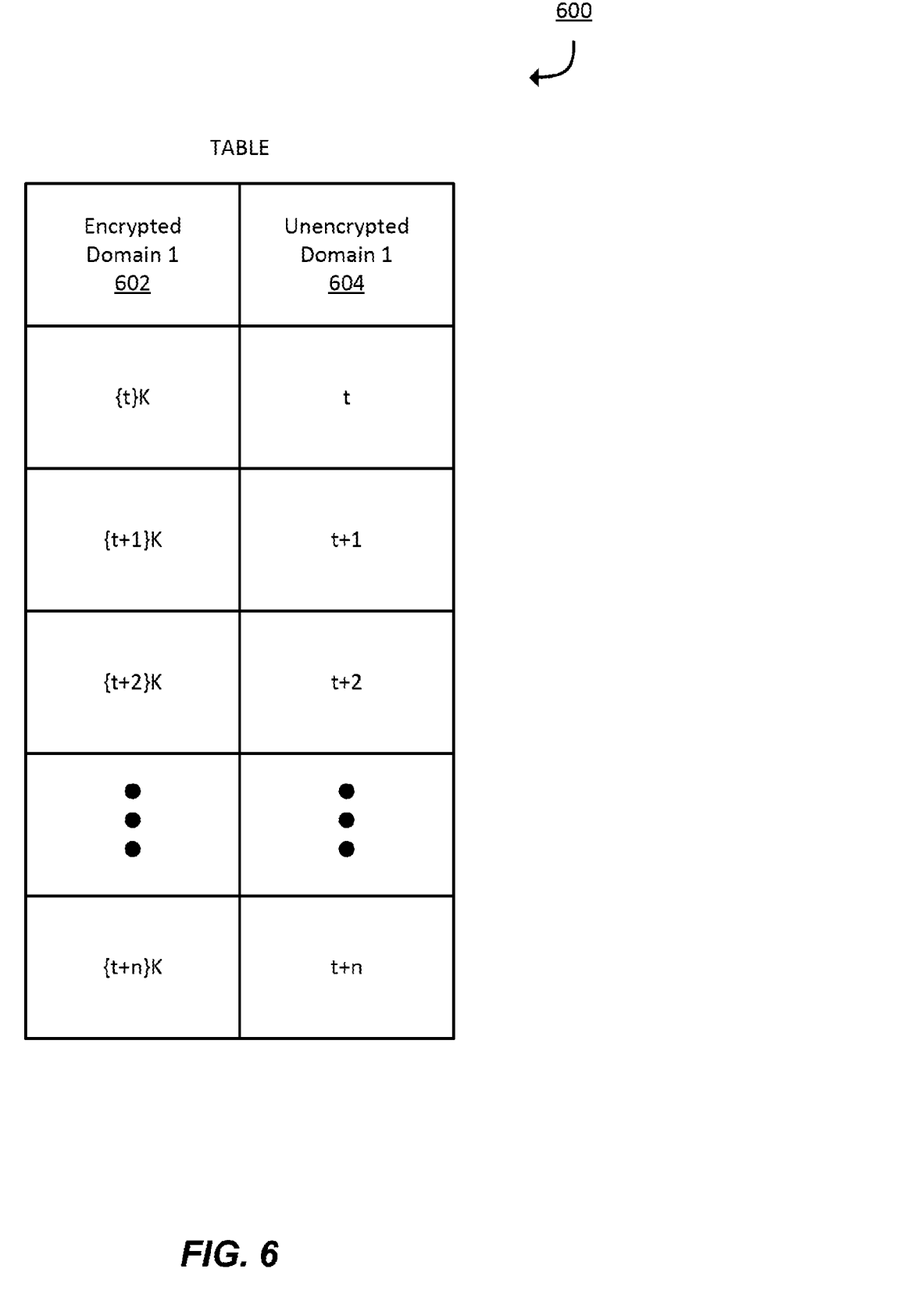
FIG. 6 shows an example of a conversion table according to an embodiment of the invention.

For example, the table may be a table 600 as shown in FIG. 6. The table can comprise encrypted and unencrypted values. The table construction module 308C may, in conjunction with the processor 302, construct the table 600 by iteratively encrypting each value in the unencrypted domain to determine the corresponding value in the encrypted domain. For example, the table construction module 308C may encrypt the values t, t+1, ..., t+n using the public key K to determine the encrypted values {t}K, {t+1}K, ..., {99}K.

In some embodiments, a threshold may be used when constructing the table. The server computer 300 may encrypt each value in the unencrypted domain that is larger than the threshold to determine the corresponding values in the encrypted domain. For example, if the threshold is equal to a value of 80, then the server computer 300 can encrypt each value in the encrypted domain that is larger than or equal to 80 (i.e., 80 to 99) to determine the values in the encrypted domain that correspond to the values of 80 to 99. The threshold may be a predetermined value. In some embodiments, the threshold may be changed over time. For example, the threshold may be tuned according to a false identification rate.

With this framework, privacy-protecting deduplication can now be implemented in the following way. After a user i, enrolls their biometric template Ti, e.g. on their user device, the biometric template Ti can be encrypted with a public key K and sent to the server computer. The server computer may have encrypted enrollment biometric templates from other users, i.e. {T1}K, ..., {Ti−1}K. The server computer can calculate $M_K(\{Ti\}K, \{T_j\}K)$ for j=1, ..., i−1 using the matching function module 308B, and, for each encrypted match value, check if the encrypted match value occurs in the previously constructed table. If the encrypted match value is in the table (i.e., the encrypted match value is greater than a threshold used when constructing the table), then the template Ti matches a second template Tj, thus a duplicate has been found.

Figure 4:
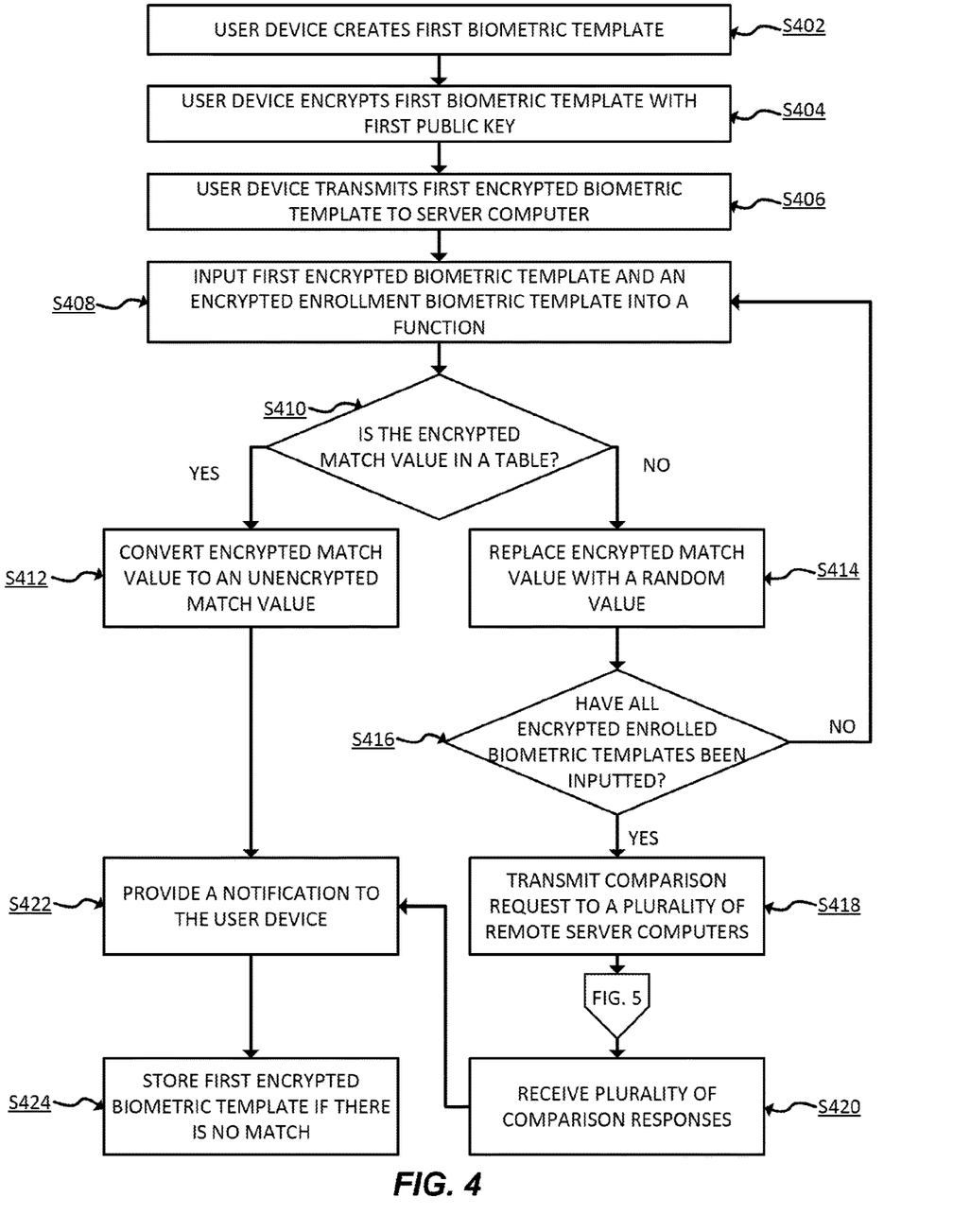
FIG. 4 shows a flow diagram depicting a method according to an embodiment of the invention.

Another, more general, embodiment is described through the use of FIG. 4 below. FIG. 4 shows a flowchart of a deduplication method according to an embodiment of the invention. The method illustrated in FIG. 4 will be described in the context of a user providing a biometric template for authentication at a department of motor vehicles (DMV) location. It is understood, however, that the invention can be applied to other circumstances (e.g., a user authenticating a biometric template for a transaction, voter identification, etc.). Although the steps are illustrated in a specific order, it is understood that embodiments of the invention may include methods that have the steps in different orders. In addition, steps may be omitted or added and may still be within embodiments of the invention. Further, in some embodiments of the present invention, the described methods may be combined, mixed, and matched, as one of ordinary skill would recognize.

Before step S402, the server computer can provide a first public key to the user device. In some embodiments, the first public key may only be used during a set period of time, as indicated by a time to live associated with the first public key. The server computer may generate the first public key and a first private key before the user device encrypts the first biometric template and provision the first public key to the user device.

Additionally, the server computer can generate a conversion table corresponding to the first public key. To generate the conversion table, the server computer can encrypt each of the values from 0 to 99, or other suitable range, sequentially with the first public key. Each encrypted value can be stored in relation to the unencrypted value in the conversion table. For example, the unencrypted value of 0 can be encrypted with the first public key, and may yield any suitable encrypted value, e.g., 333. The first row in the conversion table may comprise the value of 0 in the unencrypted domain and the value of 333 in the encrypted domain. The server computer can encrypt every possible unencrypted match value (e.g., each value in the range from 0 to 99, or each value in the range 0 to 999, etc.).

In some embodiments, the server computer can encrypt every possible match outcome value that is greater than a threshold. For example, the threshold may be a unencrypted match value of 90. The server computer can then encrypt each value from 90 to 99 with the first public key and store the unencrypted values and the encrypted values in a conversion table. In this way, when the server computer later converts from an encrypted match value to an unencrypted match value, the server computer can only convert encrypted match values that are greater than the threshold of 90, i.e., encrypted match values that are included in the table. If the server computer determines an encrypted match value that is not in the table, then the server computer can replace the encrypted match value with a random value.

At step S402, the user device may create a first biometric template using any suitable biometric reader or input scanner. For example, the user may place their finger on a fingerprint scanner located on the user device. The biometric reader can obtain a biometric sample from the user (e.g., by scanning the user's fingerprint). Upon obtaining the biometric sample from the user, the user device may create a biometric template associated with the user. The biometric template may be a digital reference of distinct characteristics that have been extracted from the biometric sample. For example, in the case where the biometric sample is a fingerprint, the biometric template may contain the minutiae (or major features) of the fingerprint.

In some embodiments, generating the first biometric template can include identifying distinctive features of the measured biometric sample and then representing the distinctive features in digital form. For example, a data file may be created from the capture of electromagnetic signals generated by a biometric reader during sample reading, in which the signals may be binned into discrete bits according to a pre-defined resolution (i.e. as expressed by the number of pixels in an image or by the sample rate of an audio file). Software stored on the user device may then be used to identify features of the data file that can be used to accurately authenticate the user. For example, the user may be asked to present his or her biometric multiple times, and a mathematical model may be used to determine features that consistently appear. The features may be represented as a binary digital file, which may form the first biometric template.

In some embodiments, generating a first biometric template can be a two-step process. First, a first data file may be created based on the measurement. For example, this can be a complete image of a fingerprint or face, or a complete voice sample. Second, the first data file can be used to identify distinctive features of the biometric sample, and information about the distinctive features can be stored in a second data file. Embodiments of the invention allow either the first data file (e.g., a data file that represents the entire biometric sample) or the second data file (e.g., a data file that represents distinctive features of the biometric sample) to be used as the first biometric template.

At step S404, after creating the first biometric template, the user device may encrypt the first biometric template with the first public key, thus creating a first encrypted biometric template. At step S406, after encrypting the first biometric template, the user device may transmit the first encrypted biometric template to the server computer. The user device may transmit the first encrypted biometric template in any suitable manner described herein.

In some embodiments, the user device may provide some user identifying information to the server computer. The user identifying information can include, but is not limited to, a form of identification, a payment credential, a primary account number (PAN), a token, a phone number, an address, a name, or an e-mail address. The user identifying information may include demographic information such as age, sex, ethnicity, hair color, eye color, etc. For example, the user device may transmit a message comprising the first encrypted biometric template and the user identifying information to the server computer. In yet other embodiments, the user device may have previously provided the user identifying information to the server computer, for example, by enrolling in a service or program prior to step S402. The user identifying information can be stored in association with an encrypted enrollment biometric template.

At step S408, after receiving the first encrypted biometric template, the server computer may input the first encrypted biometric template and an encrypted enrollment biometric template into a function to determine a match value. The server computer may, for each of a plurality of encrypted enrollment biometric templates stored in the server computer, input the first encrypted biometric template and an encrypted enrollment biometric template into a function, such as a match function described herein, to obtain an encrypted match value. The server computer can input the first encrypted biometric template and the encrypted enrolled biometric templates in any suitable order.

The match function may compare encrypted biometric templates in an encrypted domain. The match function can use homomorphic encryption which allows computation on ciphertexts, generating an encrypted result which, when decrypted, matches the result of the operations as if they had been performed on the plaintext. Embodiments of the invention may make use of any suitable homomorphic cryptosystem including partially homomorphic cryptosystems such as, but not limited to, unpadded RSA, ElGamal, Paillier, etc., as well as fully homomorphic cryptosystems such as, but not limited to, Gentry's cryptosystem, Brakerski's scale-invariant cryptosystem, Fan-Vercauteren cryptosystem (FV), etc.

In some embodiments, the server computer may access the encrypted enrollment biometric template in a server computer database. Any number of encrypted enrollment biometric templates may be stored in the server computer database. The first encrypted biometric template and an encrypted enrollment biometric template can be evaluated in an encrypted domain and the output of the match function can be an encrypted match value. The match function may not decrypt either the first encrypted biometric template or the encrypted enrollment biometric template. In other words, the match function operates within the encrypted domain as specified by the first public key, or any other public key. The encrypted match value can indicate how well the first encrypted biometric template and the inputted encrypted enrollment biometric template match.

In other embodiments, prior to inputting the first encrypted biometric template and the encrypted enrollment biometric template into the match function, the server computer can determine which of the encrypted enrollment biometric templates should be included in the plurality of encrypted enrollment biometric templates. Prior to inputting, the server computer can select the encrypted enrollment biometric template based on matching demographic information associated with the first encrypted biometric template. For example, the plurality of encrypted enrollment biometric templates can include every encrypted enrollment biometric template stored at the server computer. In other embodiments, the server computer may determine a subset of encrypted enrollment biometric templates to be included in the plurality of encrypted enrollment biometric templates. The server computer may determine the subset of encrypted enrollment biometric templates based on demographic information. The demographic information may be either known demographic information, such as the user identifying information received from the user device, or estimated demographic information that is determined based on the first biometric template.

For example, the user identifying information can include an age of the user which can be 20. The server computer can determine the subset of encrypted enrollment biometric templates based on the age of the user. The subset of encrypted enrollment biometric templates may include, for example, the encrypted enrollment biometric templates stored with an age in a range of 18-25. The server computer can include the subset of encrypted enrollment biometric templates associated with users of ages 18-25 in the plurality of encrypted enrollment biometric templates. In this way, the server computer may not need to compare the first encrypted biometric template to every single encrypted enrollment biometric template stored at the server computer, thus reducing overall computation time on average.

In some embodiments, the server computer can determine the subset of encrypted enrollment biometric templates based on different demographic information. For example, the user identifying information may include an age of 20 and a gender of female. The server computer can determine the subset of encrypted enrollment biometric templates to be included in the plurality of encrypted enrollment biometric templates based on both age and gender. In yet other embodiments, the user device can estimate demographic information based on the first biometric template prior to encrypting the first biometric template with the first public key. The user device can transmit the demographic information to the server computer along with the first encrypted biometric template.

At step S410, after inputting the first encrypted biometric template and an encrypted enrollment biometric template of the plurality of encrypted enrollment biometric templates into the function, the server computer can determine if the encrypted match value is included in the table. As an example, the encrypted match value may be a value of 4523. The server computer can search the encrypted domain values in the table for the encrypted match value (e.g., 4523). If the server computer determines that the encrypted match value is not in the table, then the server computer can proceed to step S414. If the server computer determines that the encrypted match value is in the table, then the server computer can proceed to step S412.

For example, at step S410, for each of the plurality of encrypted enrollment biometric templates in the server computer, the server computer can determine if the encrypted match value corresponds to an unencrypted match value using the table, wherein the unencrypted match value is greater than a threshold. In some embodiments, the table can be constructed using all unencrypted match values (e.g., 0-99). The server computer can determine if the encrypted match value is in the table as well as if the corresponding unencrypted match value is greater than a threshold (i.e., 80). In other embodiments, the table can be constructed using unencrypted match values that are greater than the threshold (i.e., 80-99). The server computer can determine if the encrypted match value is in the table, thus ensuring that the corresponding unencrypted match value is above the threshold that was used during construction of the table.

At step S412, after determining that the encrypted match value is included in the table, the server computer can determine an unencrypted match value corresponding to the encrypted match value using the table. The server computer can use the conversion table, as described herein, to convert the encrypted match value to the unencrypted match value. The conversion table may allow the server computer to convert values from an encrypted domain to an unencrypted domain. For example, if the encrypted match value is a value of 4523, then the server computer can determine the unencrypted match value to be 80, which may indicate an 80% match between the two templates (e.g., the first encrypted biometric template and an encrypted enrollment biometric template).

In some embodiments, if the table includes all possible encrypted match values (i.e., the table was constructed with all possible unencrypted match values without using a threshold) then, after converting the encrypted match value to an unencrypted match value, the server computer can determine if the unencrypted match value is greater than a threshold. For example, the threshold may be an integer in the range of 0 to 99, where 99 indicates a very good match and 0 indicates no match. However, if more granularity is sought, the integer 999 may be used in order to allow 1000 different degrees of match. In some embodiments, the threshold may be a variable number that may be changed at any point for any user or user device.

In other embodiments, after step S412 where the server computer determines a match, the server computer may proceed to step S416 in order to input each of the encrypted enrollment biometric templates into the function with the first encrypted biometric template. In this way, the server computer may determine if there are multiple matches.

At step S414, after determining that the encrypted match value is not included in the table, the server computer can replace the encrypted match value with a random value. The random value may indicate that the compared encrypted biometric templates do not match, for example, the first encrypted biometric template and the encrypted enrollment biometric template. In some embodiments, the random value can comprise a unique random value generated from a large set, such as, e.g. 128-bit integers. In other embodiments, the random value can be a string, or other suitable data format, indicating that the compared encrypted biometric templates do not match, for example, the string may be "no-match." The random value is preferably not a value that would indicate a match, i.e., a value that is greater than the threshold. For example, the random value can be a value that is not in the range of 80-100. In some embodiments, by replacing the encrypted match value with the random value, the unencrypted match value may be kept secret from the user device, which may prevent the user device from performing hill climbing attacks.

At step S416, after replacing the encrypted match value with a random value, the server computer can determine if the first encrypted biometric template has been compared to each encrypted enrollment biometric template of the plurality of encrypted enrollment biometric templates. If the server computer determines that the first encrypted biometric template has been compared to each encrypted enrollment biometric templates, then the server computer can proceed to step S418. If the server has not yet compared the first encrypted biometric template to each of the encrypted enrollment biometric templates, then the server computer can return to step S408 and can compare the first encrypted biometric template with the next (i.e., subsequent) encrypted enrollment biometric template. For example, if the plurality of encrypted enrollment biometric templates comprises 100 encrypted enrollment biometric templates, then the server computer can repeat steps S408-S416 a total of 100 times if the first encrypted biometric template does not match any of the encrypted enrollment biometric templates.

At step S418, after comparing the first encrypted biometric template to each encrypted enrollment biometric templates of the plurality of encrypted enrollment biometric templates, the server computer can determine that the first encrypted biometric template does not match any of the plurality of encrypted enrollment biometric templates. The server computer can transmit a match request message to a plurality of remote server computers. The match request message can include the first encrypted biometric template and, in some embodiments, the first public key. In other embodiments, the match request message can further comprise user identifying information received from the user device.

Figure 5:
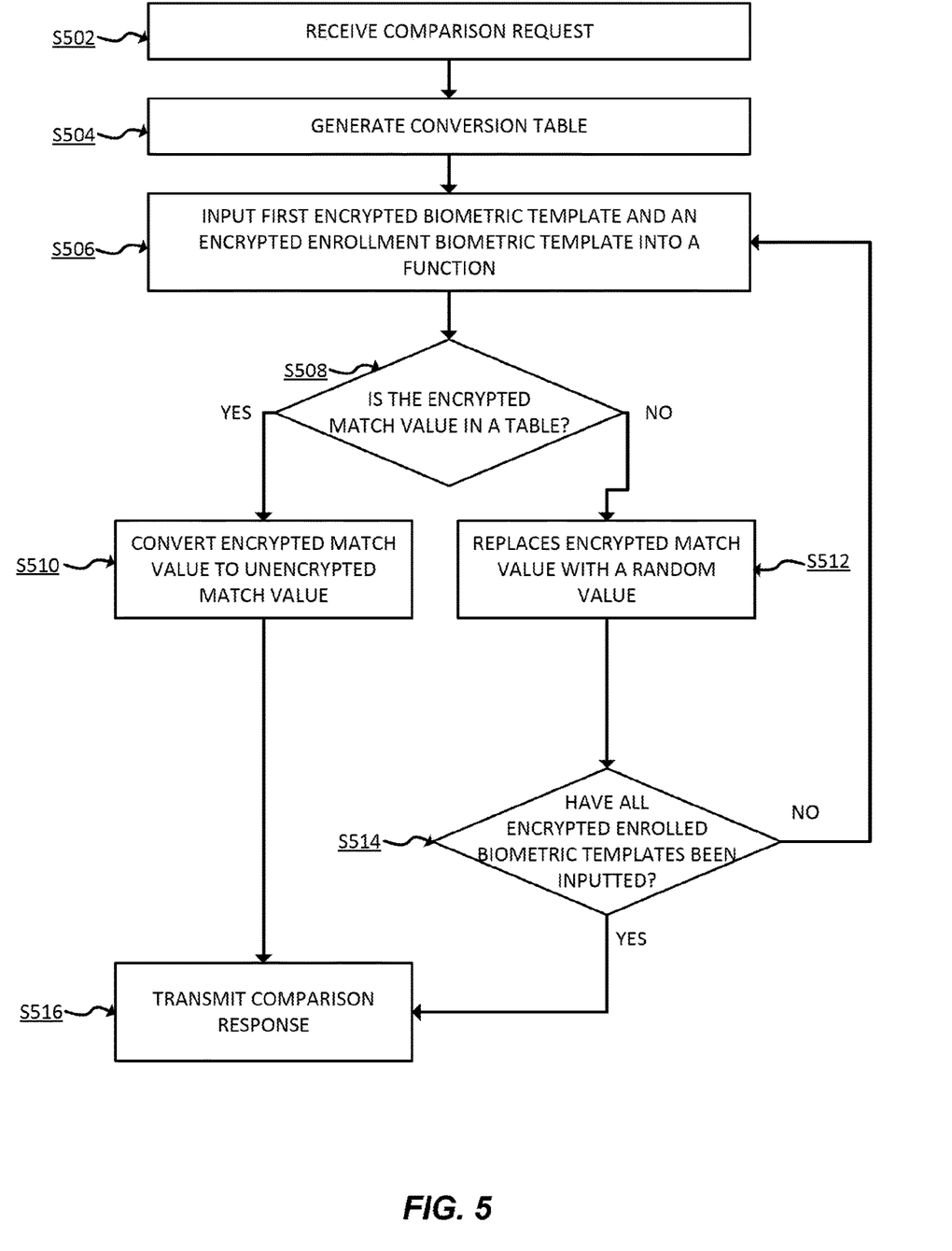
FIG. 5 shows a flow diagram depicting a remote server computer method according to an embodiment of the invention.

In some embodiments, the server computer can transmit the match request message to the plurality of remote server computers after receiving the first encrypted biometric template and before inputting the first encrypted biometric template and encrypted enrollment biometric template into the match function at step S408. In this way, the server computer may perform steps S408-S416 concurrently with the plurality of remote server computers performing steps S502-S516. In other embodiments, the server computer can determine if the first encrypted biometric template matches any of the locally stored encrypted enrollment biometric templates before transmitting match request messages to the plurality of remote server computers; in this way, the server computer can first determine if the first encrypted biometric template matches an encrypted enrollment biometric template before using additional resources at the plurality of remote server computers.

In reference to FIG. 5, at step S502 a remote server computer of the plurality of remote server computers can receive the match request message comprising the first encrypted biometric template and the first public key. In some embodiments, the match request message can further comprise user identifying information. Each of the remote server computers can perform steps S502-S516 in parallel and independently from one another.

At step S504, the remote server computer can generate a conversion table using the first public key as described herein. In some embodiments, the remote server computer may have previously generated the conversion table.

At step S506, after generating the conversion table, the remote server computer may input the first encrypted biometric template and an encrypted enrollment biometric template into a function to determine an encrypted match value. The remote server computer may, for each of a plurality of encrypted enrollment biometric templates stored in the remote server computer, input the first encrypted biometric template and an encrypted enrollment biometric template into a function, such as a match function described herein, to obtain the encrypted match value. The remote server computer can input the first encrypted biometric template and the encrypted enrolled biometric templates in any suitable order.

In some embodiments, prior to inputting the first encrypted biometric template and the encrypted enrollment biometric template into the match function, the remote server computer can determine which of the encrypted enrollment biometric templates should be included in the plurality of encrypted enrollment biometric templates, as described herein. For example, the plurality of encrypted enrollment biometric templates can include every encrypted enrollment biometric template stored at the remote server computer. In other embodiments, the remote server computer may determine a subset of encrypted enrollment biometric templates to be included in the plurality of encrypted enrollment biometric templates. The remote server computer may determine the subset of encrypted enrollment biometric templates based on demographic information. The demographic information may be either known demographic information, such as the user identifying information received from the server computer, or estimated demographic information that is determined based on the first encrypted biometric template.

At step S508, after inputting the first encrypted biometric template and an encrypted enrollment biometric template of the plurality of encrypted enrollment biometric templates into the function, the remote server computer can determine if the encrypted match value is included in the table, as described herein. If the remote server computer determines that the encrypted match value is not in the table, then the remote server computer can proceed to step S512. If the remote server computer determines that the encrypted match value is in the table, then the remote server computer can proceed to step S510.

At step S510, after determining that the encrypted match value is included in the table, the remote server computer can determine an unencrypted match value corresponding to the encrypted match value. The remote server computer can use the conversion table, as described herein, to convert the encrypted match value to the unencrypted match value. In some embodiments, the remote server computer may make use of a conversion table, as shown in FIG. 6. The conversion table may allow the remote server computer to convert values from an encrypted domain to an unencrypted domain.

In some embodiments, after determining that the encrypted match value is in the table (thus meaning that the match value is above a threshold used to create the table), the remote server computer can generate and transmit a notification regarding the match value to an entity, such as a technician, informing the entity of a match. The entity may further investigate the match to determine if a match actually occurred or if there was a false positive.

At step S512, the remote server computer can replace the encrypted match value with a random value, as described herein and can be similar to step S414 performed by the server computer (i.e., proximate server computer), as described above.

At step S514, after replacing the encrypted match value with a random value, the remote server computer can determine if the first encrypted biometric template has been compared to each encrypted enrollment biometric template of the plurality of encrypted enrollment biometric templates. If the remote server computer determines that the first encrypted biometric template has been compared to each encrypted enrollment biometric template, then the remote server computer can proceed to step S516. If the remote server computer has not yet compared the first encrypted biometric template to each encrypted enrollment biometric templates, then the remote server computer can return to step S506 can compare the first encrypted biometric template with the next (i.e., subsequent) encrypted enrollment biometric template.

At step S516, the remote server computer can transmit a match response message to the server computer. The match response message can include an indication of whether or not the first encrypted biometric template matched any of the encrypted enrollment biometric templates stored in the remote server computer's database. In some embodiments, the indication may include each of the unencrypted match values from each comparison, which, in some embodiments, may be random values. In other embodiments, the match response message may include a unencrypted match value that is greater than the threshold. In some embodiments, the unencrypted match value may be replaced with a string that states, for example, "match."

Referring back to FIG. 4, at step S420, the server computer can receive a plurality of match response messages from the plurality of remote server computers. At step S416, the server computer may generate an indication that the first encrypted biometric template and an encrypted enrollment biometric template match or do not match. The indication may be determined based on the unencrypted match value obtained by determining the unencrypted match value as described herein. In some embodiments, the indication may be determined based on the unencrypted match values and/or other data received in one or more match response messages.

At step S422, the server computer may provide a notification to the user device. For example, the server computer may transmit the indication that the first encrypted biometric template and an encrypted enrollment biometric template match or do not match, to the user device. For example, in some embodiments, the transmission may include messages such as "match," "no match," "match value=88," or "match value=5." The notification can be associated with the unencrypted match values, meaning that, in some embodiments, the notification can include a decision of whether or not the first encrypted biometric template matches one or more of the plurality of encrypted enrollment biometric templates. The user device, or other device, can receive the notification of "match" which can be associated with an unencrypted match value greater than a threshold. In other embodiments, the notification can include the unencrypted match values. In this way, the user device, or other device, can receive a notification of "95" which can be associated with an unencrypted match value of "95" which is greater than the threshold.

In some embodiments, the server computer may decide to terminate communication with the user device if the server computer determines that a match exists, thus preventing additional fraudulent attempts by a user.

In other embodiments, after determining that the encrypted match value is in the table (thus meaning that the match value is above a threshold used to create the table), the server computer can generate and transmit a notification regarding the match value to an entity, such as a technician, informing the entity of a match. The entity may further investigate the match to determine if a match actually occurred or if there was a false positive.

The server computer may also be configured to rank all of the previously determined unencrypted match values, and in some embodiments, the random values. The server computer can determine to provide the notification based on the highest ranked (i.e., most matching) encrypted enrollment biometric template, which may indicate a match or no match, to the user device.

At step S424, in some embodiments, the server computer may store the first encrypted biometric template in the server computer database if no match exists. In some embodiments, the first encrypted biometric template may later be used in authentication methods with other encrypted biometric templates supplied by other user devices and/or other users.

After step S422, or in some embodiments after step S424, the server computer and/or the user device may perform additional operations, such as an enrollment process. For example, after determining that the first encrypted biometric template does not match an encrypted enrollment biometric template, the server computer can enroll the user in a service and/or program. For example, in the DMV example, the server computer may continue with the user's driver's license application after determining that the user's biometric template does not match a previously enrolled biometric template. In this way, the server computer can determine that the user has not previously been issued a driver's license.

Additional operations can also include, if the first encrypted biometric template does match an encrypted enrollment biometric template, providing a notification to another device (other than the user device) regarding the unencrypted match value.

As an example use case, the user device may be a security camera in operative communication with a security server computer. The security server computer can comprise a server computer database storing encrypted biometrics of dangerous criminals. The security camera may create a first biometric template from a biometric sample of a person's face caught on the security camera. The security camera may then encrypt the first biometric template using a public key and can then transmit the first encrypted biometric template to the security server computer. The security server computer can input the received first encrypted biometric template and an encrypted enrollment biometric template stored by the server computer into a match function. The security server computer can input the first encrypted biometric template and encrypted enrollment biometric templates that have matching demographic information to determine an encrypted match value. The security server computer can convert the encrypted match values to unencrypted match values using a previously created conversion table. The security server computer may transmit a match request message to remote security server computers, such as security server computers located in other states and/or other jurisdictions. The security server computer may receive a match response message from the remote security server computers. If the security server computer and/or one of the remote security server computers determines that the first encrypted biometric template matches a stored encrypted biometric template then the respective server computer can generate and transmit a notification to a relevant police station so that they can evaluate the area of the security camera.

FIG. 6 shows an example of a conversion table according to an embodiment of the invention. FIG. 6 includes a table 600 that may be referred to as a conversion table. The table 600 includes an encrypted domain 1 602 and an unencrypted domain 1 604. The table 600 may comprise a plurality of encrypted match values and corresponding unencrypted match values. The table 600 may allow the server computer to convert encrypted match values from the encrypted domain 1 602 into the unencrypted domain 1 604. This results in unencrypted match values.

For example, the server computer may have determined an encrypted match value of {t+2}K after inputting two encrypted biometric templates into a match function. The server computer may determine that the encrypted match value {t+2}K is include in the encrypted domain 1 602. The server computer can then determine that the encrypted match value {t+2}K corresponds to the unencrypted match value t+2 in the unencrypted domain 1 604.

In some embodiments, the table may contain more rows and columns than shown. The table may include any number of encrypted domains and unencrypted domains. The bottom row, n, describes any number of possible rows. In some embodiments, additional columns in the table may be encrypted domain 2 and unencrypted domain 2. The encrypted domain 2 and unencrypted domain 2 may be created using a second public key. Any suitable number of public keys may be used to generate additional columns in the table 600.

Embodiments of the invention have a number of advantages. For example, the server computer does not decrypt any of the encrypted biometric templates. By not decrypting the encrypted biometric templates, security is greatly improved, for example, even if a hacker was able to gain access to the server computer they would not have access to any unencrypted biometric templates. Further, embodiments of the invention allow separate entities (i.e., server computers and remote server computers) to perform de-duplication without sharing biometric templates. Still further, embodiments of the invention remove the central repository as a point of vulnerability.

Embodiments of the invention have a number of additional advantages. As explained above, a random number may replace the encrypted match value if the encrypted match value is less than a threshold or is not included in the table. This avoids the problem of a user using the received indication against the server computer. For example, without the use of the random numbers, the user may receive a match value of 5. The user may then alter their biometric template on the user device and try again, this time receiving a match value of 20. The user may work their way either up or down in match value to attain their goal. However, random numbers are employed by the server computer, thus the user may not work their way either up or down in match value since they will receive a random number.

The computational complexity of the privacy protected de-duplication scheme, as described herein, is significant compared to de-duplication in the unencrypted domain. One way to mitigate this and reduce computation time is to use demographic information (either known or estimated from biometric information) to reduce the number of comparisons which the server computer has to perform. For example, biometric data provided by a subject of a particular age group (18-25 years) can be only de-duplicated against known biometric data provided by subjects in the similar age group.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method of determining if a biometric template is enrolled with a server computer, the method comprising:
   a) receiving, by the server computer from a user device, a first encrypted biometric template, which encrypts the biometric template, wherein the server computer stores a plurality of encrypted enrollment biometric templates, and a table comprising a plurality of encrypted match values and corresponding unencrypted match values;
   b) for each of the plurality of encrypted enrollment biometric templates in the server computer, inputting, by the server computer, the first encrypted biometric template and an encrypted enrollment biometric template into a match function that uses homomorphic encryption to obtain an encrypted match value;
   c) for each of the plurality of encrypted enrollment biometric templates in the server computer, determining if the encrypted match value corresponds to an unencrypted match value in the table comprising the plurality of encrypted match values and the corresponding unencrypted match values, wherein when the encrypted match value corresponds to the unencrypted match value, and the unencrypted match value is greater than a threshold, the biometric template is already enrolled with the server computer; and
   d) providing a notification to the user device or another device associated with the unencrypted match value.

2. The method of claim 1, wherein if the server computer determines that the encrypted match value does not correspond to an unencrypted match value using the table, the method further comprises:
   replacing, by the server computer, the encrypted match value with a random value.

3. The method of claim 1, wherein the plurality of encrypted enrollment biometric templates and the first encrypted biometric template are encrypted with a first public key.

4. The method of claim 3, wherein the server computer generates the first public key corresponding to a first private key, the first public key being made available to the user device.

5. The method of claim 1, further comprising:
   prior to inputting, selecting, by the server computer, the encrypted enrollment biometric template based on matching demographic information associated with the first encrypted biometric template.

6. The method of claim 1 further comprising:
   storing, by the server computer, the first encrypted biometric template in a database, wherein the first encrypted biometric template does not match any of the plurality of encrypted enrollment biometric templates.

7. The method of claim 1 further comprising:
   transmitting, by the server computer, a match request message comprising the first encrypted biometric template to one or more remote server computers;
   receiving, by the server computer, one or more match response messages associated with unencrypted match values from the one or more remote server computers; and
   wherein the notification is associated with the unencrypted match values.

8. The method of claim 1 further comprising:
   constructing, by the server computer, the table by encrypting a plurality of values using a first public key, wherein the plurality of values are greater than the threshold and correspond to the unencrypted match values, and wherein encryption yields the plurality of encrypted match values; and
   storing, by the server computer, the table comprising the plurality of encrypted match values and the unencrypted match values.

9. A server computer comprising:
   a processor;
   a memory; and
   a non-transitory computer-readable medium coupled to the processor, the non-transitory computer-readable medium comprising code executable by the processor for implementing a method of determining if a biometric template is enrolled with the server computer, the method comprising:
   a) receiving, from a user device, a first encrypted biometric template, which encrypts the biometric template, wherein the server computer stores a plurality of encrypted enrollment biometric templates, and a table comprising a plurality of encrypted match values and corresponding unencrypted match values;
   b) for each of the plurality of encrypted enrollment biometric templates in the server computer, inputting the first encrypted biometric template and an encrypted enrollment biometric template into a match function that uses homomorphic encryption to obtain an encrypted match value;
   c) for each of the plurality of encrypted enrollment biometric templates in the server computer, determining if the encrypted match value corresponds to an unencrypted match value in the table comprising the plurality of encrypted match values and the corresponding unencrypted match values, wherein when the encrypted match value corresponds to the unencrypted match value, and the unencrypted match value is greater than a threshold, the biometric template is already enrolled with the server computer; and d) providing a notification to the user device or another device associated with the unencrypted match value.

10. The server computer of claim 9, wherein if the server computer determines that the encrypted match value does not correspond to an unencrypted match value using the table the method further comprises:

replacing the encrypted match value with a random value.

11. The server computer of claim 9, wherein the plurality of encrypted enrollment biometric templates and the first encrypted biometric template are encrypted with a first public key.

12. The server computer of claim 11, wherein the server computer generates the first public key corresponding to a first private key, the first public key being made available to the user device.

13. The server computer of claim 9, wherein the method further comprises:

prior to inputting, selecting the encrypted enrollment biometric template based on matching demographic information associated with the first encrypted biometric template.

14. The server computer of claim 9, wherein the method further comprises:

storing the first encrypted biometric template in a database, wherein the first encrypted biometric template does not match any of the plurality of encrypted enrollment biometric templates.

15. The server computer of claim 9, wherein the method further comprises:

transmitting a match request message comprising the first encrypted biometric template to one or more remote server computers;

receiving one or more match response messages associated with unencrypted match values from the one or more remote server computers; and wherein the notification is associated with the unencrypted match values.

16. The server computer of claim 9, wherein the method further constructing the table by encrypting a plurality of values using a first public key, wherein the plurality of values are greater than the threshold and correspond to the unencrypted match values, and wherein encryption yields the plurality of encrypted match values; and storing the table comprising the plurality of encrypted match values and the unencrypted match values.

17. A method of determining if a biometric template is enrolled with a server computer, the method comprising:

receiving, by a user device, a biometric sample from a user;

creating, by the user device, a first biometric template from the biometric sample;

encrypting, by the user device, the first biometric template with a public key to yield a first encrypted biometric template;

transmitting, by the user device, the first encrypted biometric template to the server computer, wherein for each of a plurality of encrypted enrollment biometric templates stored in the server computer, the server computer inputs the first encrypted biometric template and an encrypted enrollment biometric template into a match function that uses homomorphic encryption to obtain an encrypted match value, wherein for each of the plurality of encrypted enrollment biometric templates the server computer determines if the encrypted match value corresponds to an unencrypted match value in a table comprising a plurality of encrypted match values and corresponding unencrypted match values, and when the encrypted match value corresponds to the unencrypted match value, and the unencrypted match value is greater than a threshold, the biometric template is already enrolled with the server computer; and receiving, by the user device, a notification associated with the unencrypted match value.

18. The method of claim 17 further comprising:

receiving, by the user device, the public key from the server computer, wherein the server computer generates the table using the public key.

19. The method of claim 17, wherein the server computer determines to replace the encrypted match value with a random value if the encrypted match value is not included in the table.

20. The method of claim 17, wherein the server computer transmits match request messages to one or more remote server computers, and receives, from the one or more remote server computers, match response messages comprising unencrypted match values.

* * * * *